United States Patent
Büttner et al.

(10) Patent No.: US 9,768,666 B2
(45) Date of Patent: Sep. 19, 2017

(54) EXTERNAL COOLING TUBE ARRANGEMENT FOR A STATOR OF AN ELECTRIC MOTOR

(75) Inventors: Klaus Büttner, Hollstadt (DE); Klaus Kirchner, Ostheim (DE); Norbert Wöhner, Heustreu (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 166 days.

(21) Appl. No.: 14/343,670

(22) PCT Filed: Aug. 15, 2012

(86) PCT No.: PCT/EP2012/065936
§ 371 (c)(1),
(2), (4) Date: Mar. 7, 2014

(87) PCT Pub. No.: WO2013/034413
PCT Pub. Date: Mar. 14, 2013

(65) Prior Publication Data
US 2014/0217840 A1  Aug. 7, 2014

(30) Foreign Application Priority Data
Sep. 8, 2011 (DE) .......................... 10 2011 082 353

(51) Int. Cl.
*H02K 9/00* (2006.01)
*H02K 1/20* (2006.01)
(Continued)

(52) U.S. Cl.
CPC ............... *H02K 9/005* (2013.01); *H02K 1/20* (2013.01); *H02K 9/00* (2013.01); *H02K 9/08* (2013.01);
(Continued)

(58) Field of Classification Search
CPC .. H02K 1/20; H02K 1/32; H02K 1/22; H02K 9/005; H02K 9/04; H02K 9/00;
(Continued)

(56) References Cited

U.S. PATENT DOCUMENTS 3,009,072 A * 11/1961 Mossay .................... H02K 1/20
                                                              310/57
3,075,103 A *  1/1963 Ward, Jr. ................. H02K 9/19
                                                              310/260
(Continued)

FOREIGN PATENT DOCUMENTS

DE       101 05 983           9/2002
DE       101 6 268 C1       12/2002
(Continued)

OTHER PUBLICATIONS

STIC 2800 Search Report #507317, case 14343670.*
International Search Report issued by the European Patent Office in International Application PCT/EP2012/065936 on Apr. 16, 2014.

*Primary Examiner* — Michael Andrews
*Assistant Examiner* — Maged Almawri
(74) *Attorney, Agent, or Firm* — Henry M. Feiereisen LLC

(57) ABSTRACT

A stator for an electric motor includes a substantially hollow-cylindrical stator stack provided with wire windings and an end winding, which adjoins the stator stack in the axial direction. The stator stack includes a number of slots, wherein a coolant line is inserted into the respective slot. To improve efficiency of the electric motor, a section of the respective coolant line extends into the region of the end winding.

20 Claims, 2 Drawing Sheets

(51) Int. Cl.
  *H02K 9/10* (2006.01)
  *H02K 9/18* (2006.01)
  *H02K 9/08* (2006.01)
  *H02K 9/19* (2006.01)
  *H02K 9/14* (2006.01)
  *H02K 9/16* (2006.01)

(52) U.S. Cl.
  CPC ................ *H02K 9/10* (2013.01); *H02K 9/14* (2013.01); *H02K 9/16* (2013.01); *H02K 9/18* (2013.01); *H02K 9/19* (2013.01)

(58) Field of Classification Search
  CPC .. H02K 9/08; H02K 9/10; H02K 9/14; H02K 9/16; H02K 9/18; H02K 9/19
  USPC ................ 310/58, 59, 270, 260, 52, 54, 57, 310/216.114, 216.119, 216.118
  See application file for complete search history.

(56) References Cited

U.S. PATENT DOCUMENTS

| | | | |
|---|---|---|---|
| 3,109,947 A * | 11/1963 | Thompson | H02K 9/005 310/260 |
| 3,119,032 A * | 1/1964 | Mullner | H02K 9/005 310/57 |
| 3,681,628 A * | 8/1972 | Krastchew | H02K 9/005 310/52 |
| 3,978,359 A * | 8/1976 | Kultzow | H02K 3/38 310/260 |
| 4,117,358 A * | 9/1978 | Flick | H02K 3/22 310/260 |
| 4,864,173 A * | 9/1989 | Even | H02K 49/043 188/158 |
| 5,073,734 A * | 12/1991 | Combette | H02K 3/24 310/13 |
| 5,084,641 A * | 1/1992 | Saima | H02K 5/24 181/200 |
| 5,798,587 A | 8/1998 | Lee | |
| 6,055,111 A | 4/2000 | Nomura et al. | |
| 6,645,656 B1 | 11/2003 | Chen et al. | |
| 6,645,657 B2 | 11/2003 | Huang et al. | |
| 6,800,971 B1 * | 10/2004 | Mangold | F02N 11/04 310/52 |
| 6,815,848 B1 * | 11/2004 | Glew | H02K 5/20 310/402 |
| 6,914,354 B2 * | 7/2005 | Seniawski | B60K 6/26 310/52 |
| 7,042,124 B2 * | 5/2006 | Puterbaugh | H02K 5/10 310/43 |
| 7,550,882 B2 * | 6/2009 | Verhaegen | H02K 3/24 310/52 |
| 7,589,441 B2 * | 9/2009 | Kalsi | H02K 1/12 310/180 |
| 7,705,496 B2 * | 4/2010 | Zisler | H02K 5/20 310/58 |
| 7,745,969 B2 | 6/2010 | Lyschick et al. | |
| 7,780,108 B2 | 8/2010 | Lyschick et al. | |
| 8,110,960 B2 * | 2/2012 | Bischof | H02K 1/20 310/216.119 |
| 8,161,643 B2 * | 4/2012 | Smith | H02K 5/20 165/80.5 |
| 8,247,933 B2 * | 8/2012 | Dang | H02K 1/20 310/54 |
| 8,368,258 B2 * | 2/2013 | Sugita | H02K 3/24 310/12.29 |
| 8,378,550 B2 * | 2/2013 | Bradfield | H02K 5/20 310/260 |
| 8,405,262 B1 * | 3/2013 | Beatty | H02K 1/20 310/58 |
| 9,362,785 B2 * | 6/2016 | Marvin | H02K 1/148 |
| 2002/0089242 A1 | 7/2002 | Liang et al. | |
| 2002/0125788 A1 * | 9/2002 | Leijon | H01F 3/10 310/400 |
| 2002/0167232 A1 * | 11/2002 | Randall | H02K 9/22 310/54 |
| 2004/0012272 A1 | 1/2004 | Houle | |
| 2007/0096588 A1 | 5/2007 | Kirchner et al. | |
| 2008/0100159 A1 * | 5/2008 | Dawsey | H02K 1/20 310/54 |
| 2008/0197718 A1 | 8/2008 | Wöhner | |
| 2009/0026858 A1 * | 1/2009 | Knauff | H02K 1/20 310/59 |
| 2009/0261668 A1 * | 10/2009 | Mantere | H02K 5/20 310/54 |
| 2011/0101700 A1 * | 5/2011 | Stiesdal | H02K 1/148 290/55 |
| 2011/0109095 A1 * | 5/2011 | Stiesdal | H02K 1/20 290/55 |
| 2011/0133580 A1 * | 6/2011 | Sugimoto | H02K 1/20 310/54 |
| 2011/0278968 A1 * | 11/2011 | Houle | H02K 1/20 310/54 |
| 2011/0316380 A1 | 12/2011 | Büttner et al. | |
| 2012/0133236 A1 | 5/2012 | Büttner et al. | |
| 2012/0169158 A1 | 7/2012 | Büttner et al. | |
| 2012/0187796 A1 | 7/2012 | Büttner et al. | |
| 2012/0205996 A1 | 8/2012 | Büttner et al. | |
| 2015/0171686 A1 * | 6/2015 | Folie | H02K 9/20 310/54 |

FOREIGN PATENT DOCUMENTS

| | | |
|---|---|---|
| DE | 102006005316 A1 | 8/2007 |
| DE | 10 2006 043 177 A1 | 3/2008 |
| DE | 102007013051 | 9/2008 |
| DE | 102007036032 A1 | 2/2009 |
| EP | 0915554 A2 | 5/1999 |
| JP | 59-106852 | 6/1984 |
| JP | H0946975 A | 2/1997 |
| JP | H0993869 A | 4/1997 |
| WO | WO 2006137932 A2 | 12/2006 |

* cited by examiner

EXTERNAL COOLING TUBE ARRANGEMENT FOR A STATOR OF AN ELECTRIC MOTOR

CROSS-REFERENCES TO RELATED APPLICATIONS

This application is the U.S. National Stage of International Application No. PCT/EP2012/065936, filed Aug. 15, 2012, which designated the United States and has been published as International Publication No. WO 2013/034413 and which claims the priority of German Patent Application, Serial No. 10 2011 082 353.0, filed Sep. 8, 2011, pursuant to 35 U.S.C. 119(a)-(d).

BACKGROUND OF THE INVENTION

The invention relates to a stator for an electric motor, having an essentially hollow cylindrical stator stack that is provided with wire windings, and an end winding which adjoins the stator stack in an axial direction, wherein the stator stack has a number of slots and wherein a coolant line is inserted into the respective slot.

In an electric motor, electrical energy is transformed into mechanical energy. In particular, the force exerted by a magnetic field on the coil conductors through which current flows is converted into motion. Electric motors can also execute translational motion, but are typically embodied as rotational motors.

Such an electric motor for generating a rotational motion usually has a fixed stator and a rotating rotor. The magnetic field of the stator is generated by permanent magnets or by a metal part provided with coil windings, also known as a stator stack. The stator stack typically has the structure of a hollow cylinder and is wound with the magnet wires. The respective ends of the wire windings typically emerge on one or both axial sides of the stator stack and form a wire mesh there in each case, wherein said wire mesh is also known as an end winding.

A rotor is arranged within the stator and in most cases consists of a coil having an iron core, the so-called armature, which is rotatably mounted in the magnetic field of the stator. The rotational motion is produced by the repulsion and attraction of the magnetic fields of stator and rotor. In the case of a direct-current motor, the rotation of the rotor ensures that current is supplied to the correct windings by a commutator at all times in order to achieve a continuous dynamic effect and hence rotation. A commutator can be omitted in the case of other design formats, e.g. asynchronous motors using three-phase current or alternating current, wherein an asynchronous motor has a squirrel-cage winding in the rotor instead.

In recent years, owing to the increased environmental awareness and the shortage of natural resources, greater use is being made of the electric motor as a means of vehicle propulsion. Electric propulsion is in many ways superior to the internal combustion engine, e.g. in terms of the efficiency and the advantageous torque and performance characteristics of an electric motor. Moreover, the drive train is for the most part significantly easier to construct.

However, the limited range of electric vehicles is often disadvantageous, resulting from the comparatively limited amounts of energy which can currently be carried in energy stores such as accumulators according to the prior art. The problem therefore arises, particularly in the case of electric vehicles, of using the available energy as efficiently as possible, i.e. optimizing the efficiency of the vehicle.

This can be achieved e.g. by utilizing waste heat which would otherwise be discharged into the engine compartment and therefore lost. Casings for electric motors are therefore often cooled by a fluid which flows through them and can then supply the heat to various units for further use, e.g. the interior heating. The fluid is guided in corresponding coolant lines which are inserted or cast-in. The casing is often in direct contact with the stator stack in this case, such that the heat produced in the stator stack can be removed directly.

It is often disadvantageous in this context that, due to the temperature drop between stator stack and cooled casing during operation, very high stresses are produced as a result of the thermal expansion. These can result in unacceptable distortions in the stator stack or casing. Therefore coolant lines are also integrated directly into the stator stack in some cases, said stator stack being provided with corresponding slots into which the coolant lines are inserted.

SUMMARY OF THE INVENTION

The object of the invention is now to specify a stator of the type cited in the introduction, which allows the efficiency of the electric motor to be further improved.

This object is achieved according to the invention by providing for a section of the respective coolant line to extend into the region of the end winding.

In this case, the invention takes as its starting point the idea that heat is generated not only by the stator stack itself, but also by the adjoining wire windings in the end winding. For the most part, this heat emitted at the end winding cannot be transferred to the fluid using existing measures, and therefore efficiency losses occur. Provision should therefore be made for effective removal of dissipated heat from the end winding into the fluid. No additional coolant lines should be provided in this case, as this would result in a comparatively complicated construction. The existing coolant lines of the stator stack should instead have a type of dual use, being also used for the purpose of cooling the end winding. This can be achieved by making provision for a section of the respective coolant line to extend into the region of the end winding.

In an advantageous embodiment, the respective coolant line is designed as a cooling coil. This means that the coolant line is so embodied as to comprise multiple turns and bends, and not as a simple line which extends more or less in one direction only. This increases the surface that can be cooled, since a greater total length of the coolant line is produced over the same area. More uniform cooling of the stator stack is therefore achieved.

In a further advantageous embodiment, inlet and outlet of the respective coolant line are arranged on the same axial side of the stator stack in this case. The coolant line or cooling coil is therefore arranged in a countercurrent direction. This also allows more uniform cooling due to the side-by-side arrangement of regions of coolant that are cool and regions of coolant which have previously been heated by the removal of heat from the stator stack. Moreover, the arrangement of inlet and outlet at the same position allows a simple installation.

In a particularly advantageous embodiment, a cooling plate is connected to the respective section arranged in the region of the end winding. Such a cooling plate in the region of the end winding improves the heat exchange between end winding and coolant line. For this purpose, the cooling plate should have an optimal thermal coupling to the coolant line. The heat transfer at the end winding can take place either via direct contact or via forced convection in this case. The surface of the cooling plate should be optimally configured according to the heat transfer method in this case.

In a further advantageous embodiment, the respective cooling plate is arranged on the radial outer side of the end winding. As a result of the general expansion of the end winding during operation, the gap between cooling plate and end winding is thereby reduced or the contact improved. The heat transfer is therefore further optimized.

In a further advantageous embodiment, the respective section and/or possibly the respective cooling plate is provided with an electrical insulation. This ensures a good electrical insulation, particularly if the end winding is in direct contact with the cooling elements. The electrical insulation should nonetheless be thermally conductive in this case, possibly using a foil, for example.

The conduction of heat in the coolant line should also be optimized within the stator stack. To this end, the stator stack advantageously has a hollow space, extending in the direction of a slot, in a region that is not provided with a slot. Since the hollow spaces have poorer heat conduction properties than the metal of the stator stack, the flow of heat is tangentially blocked and directed into the slots. This results in even faster and better heat transfer into the coolant lines located in the slots. In addition to this, the hollow spaces bring about a reduction in weight, which is advantageous when applied to motor vehicles in particular.

In an advantageous embodiment, a stator of the described type is part of an electric motor. Such an electric motor advantageously ensures particularly efficient operation in a motor vehicle.

The invention has the particular advantage that, by extending the cooling system into the region of the end winding of the stator stack, effective removal of dissipated heat from the end winding into the coolant can be achieved and therefore the overall efficiency is improved because this heat can be used. In particular, an energy saving is achieved in electric vehicles when external temperatures are cooler, since the waste heat which can now be used for heating and defrosting purposes is increased and energy from the battery need not be consumed for this purpose. Due to the direct integration of the relevant coolant lines in the stator stack, the temperature differences relative to the casing of the electric motor are also minimized, thereby preventing unacceptable deformations caused by differing thermal expansion. This has a positive effect on the service life.

BRIEF DESCRIPTION OF THE DRAWING

The invention is explained in greater detail with reference to a drawing, in which.

Identical parts are denoted by the same reference characters in all FIGs.

DETAILED DESCRIPTION OF PREFERRED EMBODIMENTS

Figure 1:
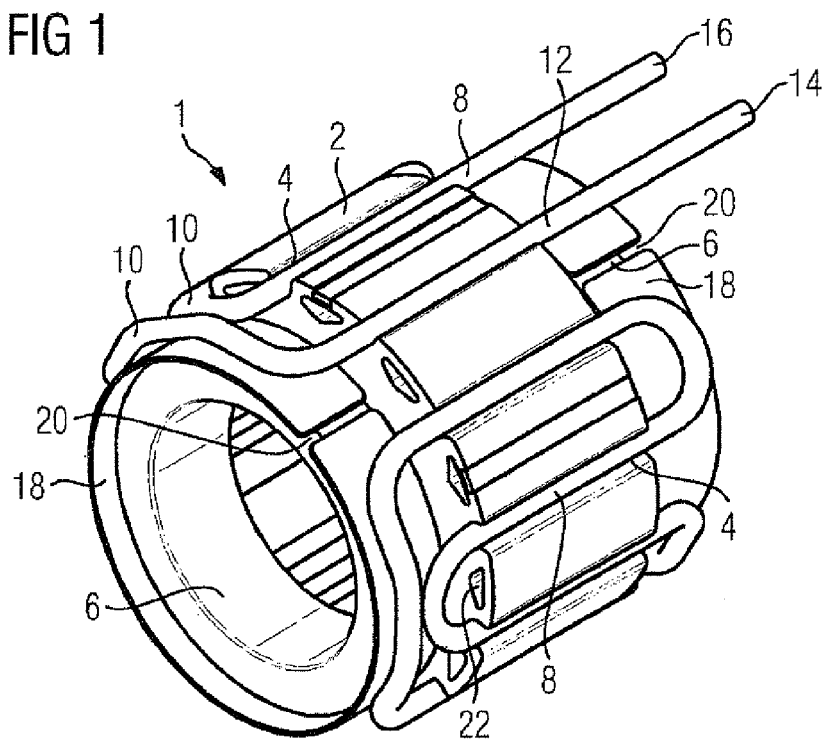
FIG. 1 shows a schematic perspective illustration of a part of a stator for an electric motor of an electric motor vehicle.

FIG. 1 shows a schematic perspective illustration of a part of the stator 1 for an electric motor as used in an electric motor vehicle. The figure shows the stator stack 2 of the stator, wherein said stator stack 2 is made of a magnetic metal, has essentially the structure of a hollow cylinder and forms a metal core for an electromagnet. The electromagnet is formed by a multiplicity of metal wires in windings, these being omitted from the illustration for the sake of simplicity. The metal wires emerge at the axial ends of the stator stack 2 in each case and form an end winding 6 in each case, this being illustrated only schematically.

The stator stack 2 has slots 4 on its radial outer side, said slots 4 being oriented in an axial direction and extending along the entire axial section of the stator stack 2. The slots are evenly spaced in a tangential direction. Inserted into the slots 4 are coolant lines 8, by means of which the heat emitted by the stator stack 2 is transferred into a coolant and carried away. The heat is then reused in the motor vehicle.

In order now to increase the overall efficiency of the motor vehicle, provision is made for the heat emitted by the end windings 6 likewise to be transferred for further use. To this end, sections 10 of the coolant line 8 extend into the region of the end windings 6. The sections 10 are bent so as to form a U-shape, such that they interconnect the parts of the coolant lines 8 located in the slots 4. They therefore form a cooling coil 12. Inlet 14 and outlet 16 of the cooling coil 12 are located on the same axial side of the stator stack 2 in this case, and are arranged in axial extension of two adjacent slots 4.

In order further to improve the heat transfer from the end winding 6 into the coolant, cooling plates 18 are attached to the sections 10 of the cooling coil 12. These are so configured as to allow optimal heat transfer to the cooling coil 12. The cooling plates 18 are likewise disposed in the form of a hollow cylinder in each case and surround the respective end windings on the radial outer side thereof. The cooling plates 18 do not form a closed hollow cylinder, however, but include a gap 20 in an axial direction. This correlates with a cooling coil 12 region in which the cooling coil 12 does not have any tangentially spreading regions that extend over the line formed by the gap 20. Therefore the cooling coil 12 can be expanded with the cooling plates 18, e.g. for insertion into the stator stack 2.

The cooling plates 18 are provided with an insulation which reliably prevents an electrical short-circuit between the wires of the end winding 6 and the cooling plate 18, even if the end winding 6 expands during operation of the electric motor and contact occurs.

In order to achieve better conduction of the heat flow into the coolant line 8, the stator stack 2 has hollow spaces 22 which are arranged between the slots 4 and extend in an axial direction. These block the flow of heat away from the slots 4.

Figure 2:
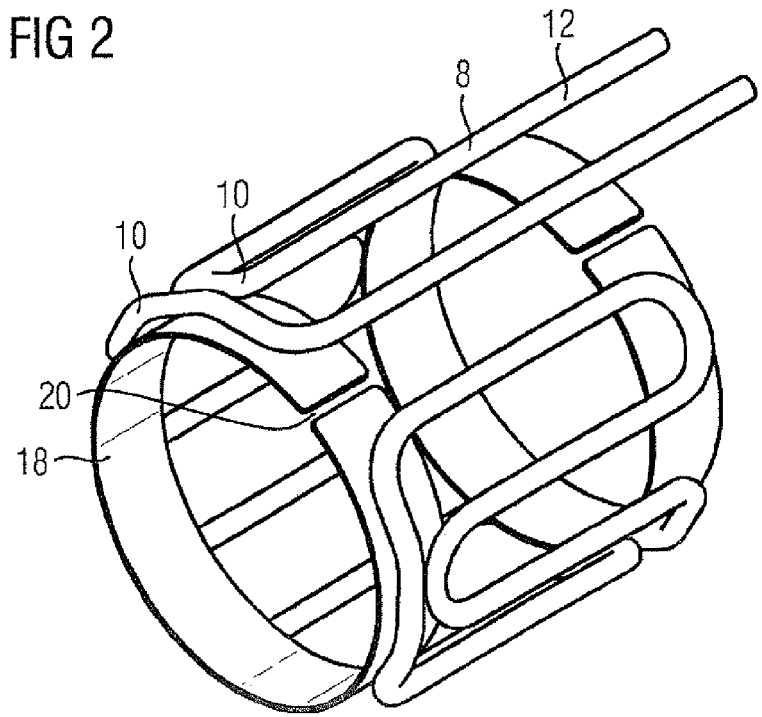
FIG. 2 shows an illustration of a cooling coil of the stator from FIG. 1.

FIG. 2 shows the cooling coil 12 with the cooling plates 18 before insertion into the stator stack 2. The individual components, the sections 10, the coolant lines 8 and the gaps 20 in the cooling plates 18 can be seen here, as can the general shape of the cooling coil 12, which extends in a snaking manner around the whole hollow cylinder.

Figure 3:
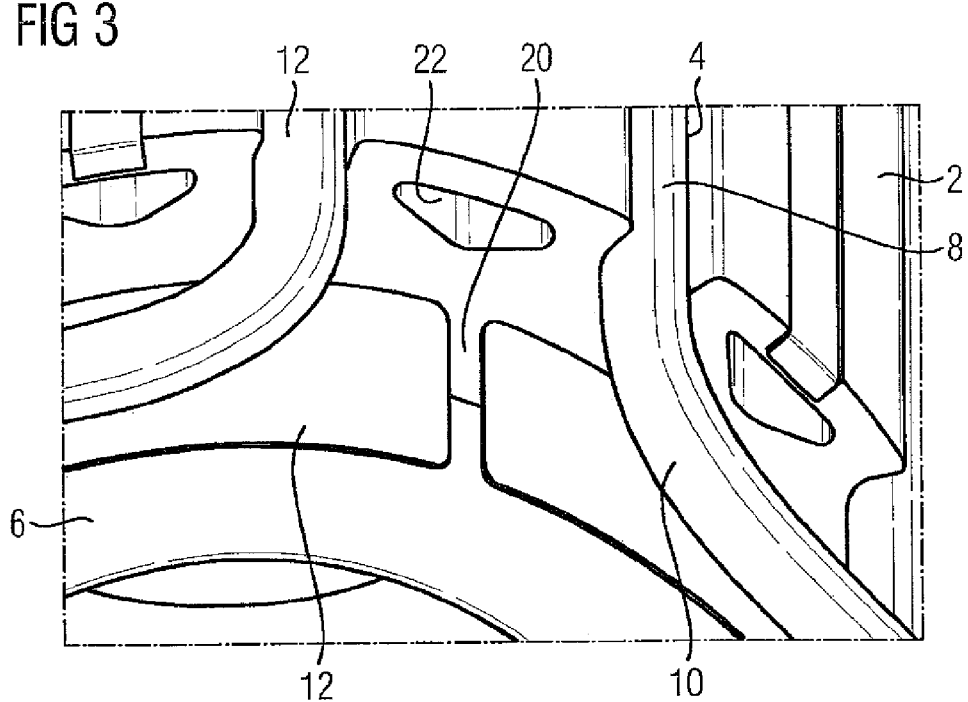
FIG. 3 shows a magnified illustration of a region of the end winding of the stator from FIG. 1.

FIG. 3 shows a magnified view of FIG. 1 from an oblique axial direction in the region around the gap 20.

Figure 4:
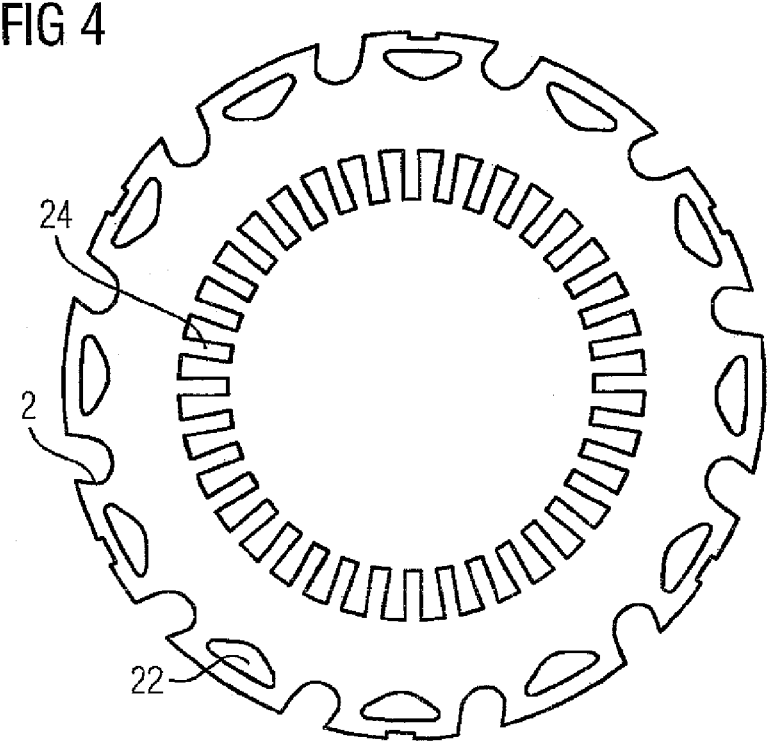
FIG. 4 shows a cross-section of a stator stack of the stator from FIG. 1.

FIG. 4 lastly shows a radial-tangential section through the stator stack 2. In particular, the slots 4 and hollow spaces 22 which are alternately arranged and are evenly spaced in a tangential direction are shown. On its radial inner side, the stator stack 2 has structures 24 for holding the wires of the stator windings.

The described embodiment of the stator 1 results in improved removal of heat, allowing it to be used in other components of an electric motor vehicle and thereby improving the efficiency.

What is claimed:

1. A stator for an electric motor, comprising:
an essentially hollow cylindrical stator stack having an axis and provided with wire windings, said stator stack having a number of slots;
an end winding adjoining the stator stack in an axial direction;
coolant lines configured as cooling coils each having a straight longitudinal section extending in the axial direction and inserted into a respective one of the slots, said coolant coils also each having an axial end section extending in a circumferential direction and located in into a region of the end winding,
the stator stack has a plurality of peripherally closed circumferentially spaced hollow spaces extending in the axial direction and located between the slots in which the straight longitudinal sections of the cooling coils are located, and improving heat conduction; and
a cooling plate forming a hollow cylinder surrounding the end winding and attached to the axial end section of the cooling coils at a radially outer side of the end winding such that the axial end sections of the cooling coils extend circumferentially over the cooling plate at a radially outer side of the cooling plate,
wherein each of the cooling coils has two such axial end sections which are spaced from each other in the axial direction and arranged on a radially outer surface of the cooling plate in contact with the radially outer surface of the cooling plate, and
wherein the cooling plate is configured not as a closed cylinder but instead has a gap extending in an axial direction and provided in a region in which the cooling coils do not have any tangentially spread regions extending over the gap.

2. The stator of claim 1, wherein the coolant lines have each an inlet and an outlet, said inlet and outlet being arranged on a same axial side of the stator stack.

3. The stator of claim 1, further comprising an electrical insulation provided for the section.

4. The stator of claim 1, further comprising an electrical insulation provided for the cooling plate.

5. The stator of claim 1, wherein the stator stack has a hollow space configured to extend in slot direction in a region that is not provided with a slot.

6. The stator of claim 1, further comprising another cooling plate attached to an axially opposite axial end section of the cooling lines.

7. The stator of claim 1, wherein the axial end section of the cooling coils is U-shaped and interconnects the straight longitudinal sections of the cooling coils.

8. The stator of claim 1, wherein the axial end sections of at least two of the cooling coils are spaced from each other in the axial direction and arranged on a radially outer surface of the cooling plate in contact with the a radially outer surface of the cooling plate.

9. An electric motor, comprising a stator which includes an essentially hollow cylindrical stator stack having an axis and provided with wire windings, said stator stack having a number of slots, an end winding adjoining the stator stack in an axial direction, coolant lines configured as cooling coils each having a straight longitudinal section extending in the axial direction and inserted into a respective one of the slots, said coolant coils also each having an axial end section extending in a circumferential direction and located in a region of the end winding, the stator stack has a plurality of peripherally closed circumferentially spaced hollow spaces extending in the axial direction and located between the slots in which the straight longitudinal sections of the cooling coils are located, and improving heat conduction; and a cooling plate forming a hollow cylinder surrounding the end winding and attached to the axial end section of the cooling at a radially outer side of the end winding such that the axial end sections of the cooling coils extend circumferentially over the cooling plate at a radially outer side of the cooling plate, wherein each of the cooling coils has two such axial end sections which are spaced from each other in the axial direction and arranged on a radially outer surface of the cooling plate in contact with the radially outer surface of the cooling plate, and wherein the cooling plate is configured not as a closed cylinder but instead has a gap extending in an axial direction and provided in a region in which the cooling coils do not have any tangentially spread regions extending over the gap.

10. The electric motor of claim 9, wherein the coolant lines have each an inlet and an outlet, said inlet and outlet being arranged on a same axial side of the stator stack.

11. The electric motor of claim 9, wherein the stator has an electrical insulation provided for the section, the cooling plate or both.

12. The electric motor of claim 9, further comprising another cooling plate attached to an axially opposite axial end section of the cooling lines.

13. The electric motor of claim 9, wherein the axial end section of the cooling coils is U-shaped and interconnects the straight longitudinal sections of the cooling coils.

14. The stator of claim 9, wherein the axial end sections of at least two of the cooling coils are spaced from each other in the axial direction and arranged on a radially outer surface of the cooling plate in contact with the a radially outer surface of the cooling plate.

15. A motor vehicle having an electric motor, said electric motor including a stator which includes an essentially hollow cylindrical stator stack having an axis and provided with wire windings, said stator stack having a number of slots, an end winding adjoining the stator stack in an axial direction, coolant lines configured as cooling coils each having a straight longitudinal section extending in the axial direction and inserted into a respective one of the slots, the stator stack has a plurality of peripherally closed circumferentially spaced hollow spaces extending in the axial direction and located between the slots in which the straight longitudinal sections of the cooling coils are located, and improving heat conduction, said coolant coils also each having an axial end section extending in a circumferential direction and located in a region of the end winding; and a cooling plate forming a hollow cylinder surrounding the end winding and attached to the axial end section of the cooling coils at a radially outer side of the end winding such that the axial end sections of the cooling coils extend circumferentially over the cooling plate at radially outer side of the cooling plate, wherein each of the cooling coils has two such axial end sections which are spaced from each other in the axial direction and arranged on a radially outer surface of the cooling plate in contact with the radially outer surface of the cooling plate, and wherein the cooling plate is configured not as a closed cylinder but instead has a gap extending in an axial direction and provided in a region in which the cooling coils do not have any tangentially spread regions extending over the gap.

16. The motor vehicle of claim 15, wherein the coolant lines have each an inlet and an outlet, said inlet and outlet being arranged on a same axial side of the stator stack.

17. The motor vehicle of claim 15, wherein the stator has an electrical insulation provided for the section, the cooling plate or both.

18. The motor vehicle of claim 15, further comprising another cooling plate attached to an axially opposite axial end section of the cooling lines.

19. The motor vehicle of claim 15, wherein the axial end section of the cooling coils is U-shaped and interconnects the straight longitudinal sections of the cooling coils.

20. The stator of claim 15, wherein the axial end sections of at least two of the cooling coils are spaced from each other in the axial direction and arranged on a radially outer surface of the cooling plate in contact with the a radially outer surface of the cooling plate.

* * * * *